(12) United States Patent
Vazach (10) Patent No.: US 7,742,492 B2
(45) Date of Patent: Jun. 22, 2010

(54) REAL TIME DATA EXPANSION FOR DISTRIBUTED I/O

(75) Inventor: Joseph G. Vazach, Mentor, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 667 days.

(21) Appl. No.: 11/624,372

(22) Filed: Jan. 18, 2007

(65) Prior Publication Data

US 2007/0198749 A1 Aug. 23, 2007

Related U.S. Application Data

(60) Provisional application No. 60/765,047, filed on Feb. 3, 2006.

(51) Int. Cl.
  *G06F 3/00* (2006.01)
  *H04L 12/26* (2006.01)
(52) U.S. Cl. .......................................... 370/419; 710/52
(58) Field of Classification Search ................ 370/452; 395/307–309, 500; 710/21, 52; 714/726
See application file for complete search history.

(56) References Cited

U.S. PATENT DOCUMENTS

| | | | |
|---|---|---|---|
| 4,394,733 A | | 7/1983 | Swenson |
| 4,413,317 A | | 11/1983 | Swenson |
| 4,425,615 A | | 1/1984 | Swenson et al. |
| 4,992,956 A | * | 2/1991 | Kaku et al. ................ 358/1.15 |
| 5,581,462 A | | 12/1996 | Rogers |
| 5,784,649 A | | 7/1998 | Begur et al. |
| 5,797,043 A | | 8/1998 | Lewis et al. |
| 5,822,553 A | * | 10/1998 | Gifford et al. ............... 710/305 |
| 5,905,568 A | * | 5/1999 | McDowell et al. ............ 356/28 |
| 5,909,568 A | * | 6/1999 | Nason ......................... 703/23 |
| 6,044,225 A | | 3/2000 | Spencer |
| 6,611,933 B1 | * | 8/2003 | Koenemann et al. ......... 714/726 |
| 6,662,247 B1 | * | 12/2003 | Ales et al. ..................... 710/52 |

FOREIGN PATENT DOCUMENTS

JP 2005103690 4/2005

\* cited by examiner

*Primary Examiner*—Dang T Ton
*Assistant Examiner*—Mohamed Kamara
(74) *Attorney, Agent, or Firm*—Fay Sharpe LLP; R. Scott Speroff; John H. Miller (57) ABSTRACT

The present exemplary embodiment relates to industrial machine control and corresponding communication protocols. In one embodiment, the machine control communication protocol is Distributed I/O that has Extended Data Transfer (EDT) capability. It finds particular application with expanding the underutilized bandwidth of the EDT to gather/send secondary input and output data within a control system. In one aspect, a system communicates data from a network to an input/output module. An adapter module receives data. The adapter module includes a network data component that receives data from a network including an output data component that receives standard data and an output expansion data component that receives cyclic EDT data. A Distributed bus data component receives data from the network data component. A Distributed extended data transfer (EDT) module receives data from the adapter module via the Distributed bus data component, wherein standard output data is communicated utilizing a standard data scan, and expansion output data is communicated utilizing a cyclic EDT protocol.

20 Claims, 8 Drawing Sheets

| CYCLIC EDT COMMUNICATION STATUS BITS | | |
|---|---|---|
| 0 | 0 | n |
| 1 | 1 | n+1 |
| 2 | 2 | n+2 |
| 3 | 3 | n+3 |
| 4 | 4 | n+4 |
| 5 | 5 | n+5 |
| 6 | 6 | n+6 |
| 7 | 7 | n+7 |
| 8 | 8 | m |
| 9 | 9 | m+1 |
| 10 | 10 | 0 |
| 11 | 11 | 0 |
| 12 | 12 | 0 |
| 13 | 13 | 0 |
| 14 | 14 | 0 |
| 15 | 15 | 0 |

REAL TIME DATA EXPANSION FOR DISTRIBUTED I/O

CROSS-REFERENCE TO RELATED PATENTS AND APPLICATIONS

This application claims the benefit of U.S. Provisional Patent Application Ser. No. 60/765,047 filed on Feb. 3, 2006 and entitled "Real Time Data Expansion for Flex I/O," the entirety of which is incorporated by reference herein.

BACKGROUND

The present exemplary embodiment relates to industrial machine control and corresponding communication protocols. In one embodiment, the machine control communication protocol is Distributed I/O that has Extended Data Transfer (EDT) capability. It finds particular application with expanding the underutilized bandwidth of the EDT to gather/send secondary input and output data within a control system and will be described with particular reference thereto. However, it is to be appreciated that the present exemplary embodiment is also amenable to other like applications.

Figure 1:
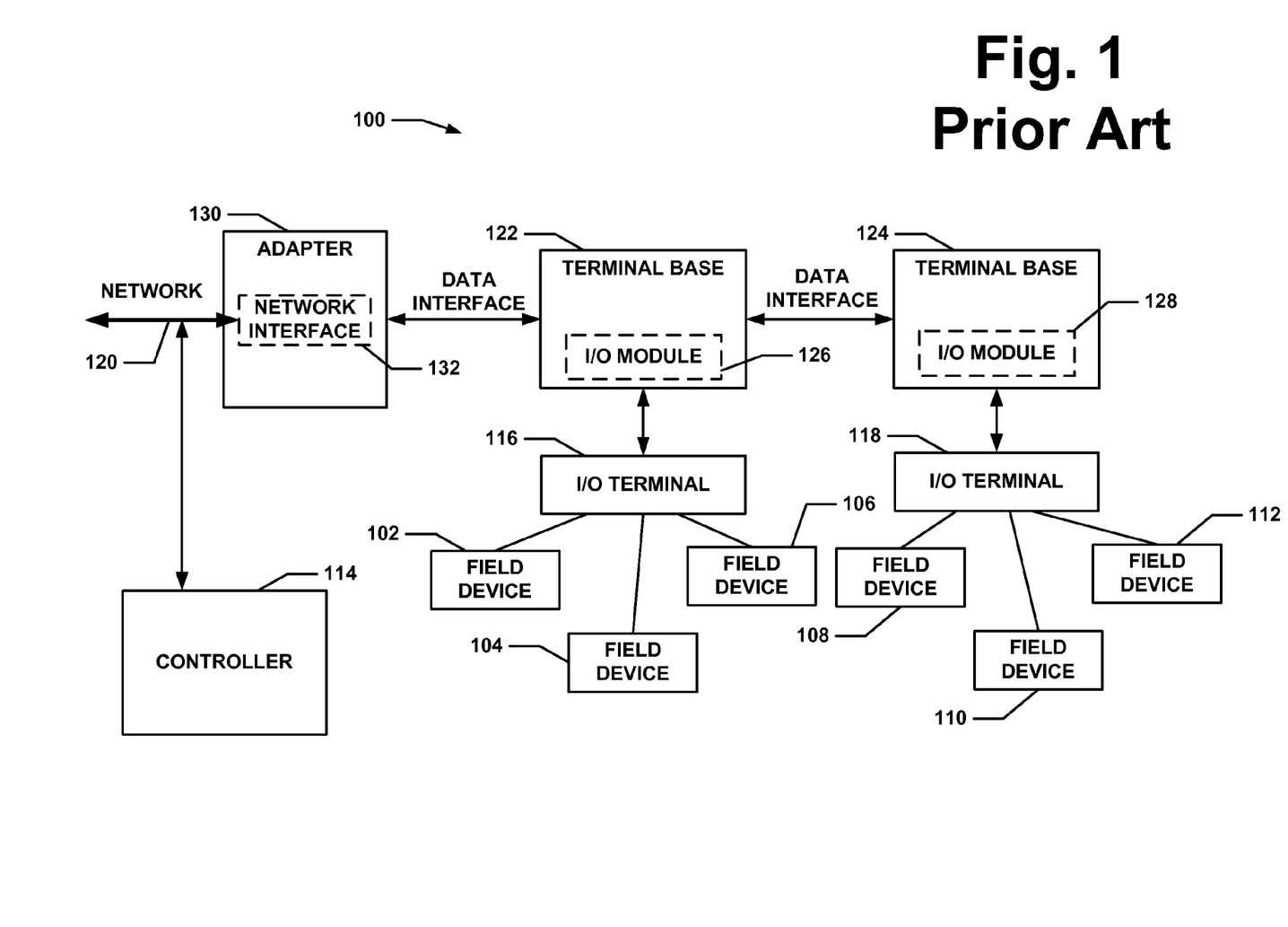
FIG. 1 illustrates an exemplary embodiment of the machine control system utilizing Distributed I/O, in accordance with an exemplary embodiment.

Machines in today's industrial environment employ various control mechanisms to provide optimum performance. Thus, data can be received in various forms to control one or more processes. In one example, machines require precision control with regard to motion and therefore control of motor speeds, torques and other parameters. As shown in FIG. 1, this information can be gathered and transmitted via one or more field devices 102, 104, 106, 108, 110 and 112 mounted in proximity to a machine process. The one or more field devices 102-112 can be sensors, actuators, switches, etc. In one example, sensors can measure data including temperature, distance, flow rate, etc. This data can be transmitted and received in various forms including voltage, current, serially, etc.

This transmitted data can be stored and/or processed in a controller 114 such as a programmable logic controller (PLC). The PLC 114 can receive data from the one or more field devices 102-112 via one or more input/output (I/O) terminals 116, 118 at a particular rate. The I/O terminals, 116,118 can provide a hardwire connection for the one or more field devices 102-112 to a respective terminal base 122, 124. In one example, the I/O terminals 116, 118 are screw terminals which accept one or more hardwire connections. The terminal base 122, 124, is coupled to an I/O module 126, 128, that is specific to a particular data type. In one example, the I/O module 126 is an analog input/output module. In another example, the I/O module 128 is a digital input/output module.

The I/O terminals 116, 118 can be located remotely from the PLC 114 and communicate with the field devices 102-112 via network 120 or communication means. Various protocols and/or standards are utilized for the transmission of data in a machine controlled system. These protocols are typically related to a manufacturer of one or more control components, PLC, control devices, and/or data transmission media. In addition, the protocol and hardware associated therewith can be selected based on logistical concerns data location, machine layout, etc. The protocol can include field device help information, data integrity, etc. in addition to actual data values. In this manner, a machine control system can identify and remedy any breakdown in data communication between the field devices and the central controller to provide a more robust control system. An adapter 130 can be employed to provide an interface for communication between the I/O modules 126, 128 and the network. Communication between the terminal base 122 and the terminal base 124 and the terminal base 122 and an adapter 130 can be facilitated via a data interface. The adapter 130 can include a network interface 132 to allow connection to the network 120. The network 120 can employ a particular communication protocol such as EtherNet/IP™, Control Net™, Device Net™, Profibus, etc.

Once the data is received, the PLC can manipulate the data in substantially any manner as set forth in a program. In one example, the data can undergo one or more mathematical operations such as summation, averaging, etc. The PLC 114 programs can be stored and activated based on one or more conditions such as an event, a threshold, etc. Once the program has completed data processing, information can be output from the PLC 114 via one or more output terminals, ports, etc. to the field devices employed to control the machine.

One protocol utilized for machine control is Distributed I/O which is employed with a distributed I/O machine control architecture. Distributed I/O can provide flexibility to allow a designer to use a precise amount of hardware in one or more remote locations for a particular control design. The distributed I/O hardware can be offered in modular block styles. Distributed I/O is a modular I/O that employs a system of interface cards and communication adapters that interface directly to the field not based directly to one or more field devices (e.g., sensors, actuators, switches, etc.) of the machine and communicate their status to the controller via the network 120. In this manner, the designer can mix and match I/O interfaces and communications adapters. For example, a designer can independently select I/O type, termination and network to meet requirements of a particular application.

Typically, a Distributed I/O adapter module (e.g. adapter 130) interfaces one or more Distributed I/O modules (e.g. I/O modules 126, 128) to an I/O scanner port across the communication network. The Distributed I/O adapter module contains a built-in power supply that converts 24V DC to 5V DC for the backplane to power the Distributed I/O module. Distributed I/O adapter modules can be utilized for EtherNet/IP™, ControlNet™, DeviceNet™, Universal Remote I/O, Profibus DP, etc. In one example, an adapter communicates with up to eight I/O modules, allowing connection to two hundred and fifty six digital input/output points or sixty four analog input points/thirty two analog output points, or a combination thereof.

Currently, adapters scan Distributed I/O modules gathering/sending data to the sixteen word area of the Distributed I/O module. One exception can occur when the Distributed I/O module has Distributed EDT capabilities. Usually, the Distributed EDT capability is utilized to send larger configuration data to a Distributed EDT module. Distributed EDT occurs when a MSG construction is sent for the I/O module and this information is not readily available in the adapter 130. Therefore, the adapter 130 sends a Distributed EDT communication that response to the MSG instruction. Usually, this does not occur frequently. Therefore, most of the Distributed EDT bandwidth is underutilized. Thus, what are needed are systems and methods to use this EDT bandwidth to provide additional functionality to the Distributed I/O product family.

BRIEF DESCRIPTION

In one aspect, a system communicates data from a network to an input/output module. An adapter module receives data. The adapter module includes a network data component that receives data from a network including an output data component that receives standard data and an output expansion data component that receives cyclic EDT data. A Distributed bus data component receives data from the network data component. The Distributed bus data component includes an output data component that receives standard data from the output component contained in the network data component and an output expansion data component that receives cyclic EDT data from the expansion data component contained in the network data component. A Distributed extended data transfer (EDT) module receives data from the adapter module via the Distributed bus data component, wherein standard output data is communicated utilizing a standard data scan, and expansion output data is communicated utilizing a cyclic EDT protocol.

In another aspect, a method is employed to utilize a real time data extension protocol with a Distributed I/O module. One or more modules are scanned to determine if it includes at least one I/O module. A determination is made if at least one of the I/O modules is a Distributed I/O module and at least one cyclic EDT assembly is identified in the at least one Distributed I/O module. A cyclic EDT is scheduled in the one or more assemblies in the EDT module.

In yet another aspect, a system communicates data from an input/output module to a network. A Distributed extended data transfer (EDT) module receives data from one or more sources. The Distributed EDT module includes an input data component that receives standard data and an input expansion data component that receives expansion data. An adapter module receives data from the distributed EDT module, wherein standard output data is communicated utilizing a standard data scan, and expansion output data is communicated utilizing a cyclic EDT protocol. The adapter module includes a Distributed bus data component that receives data from the Distributed EDT module. The Distributed bus data component includes an input data component that receives standard data from the input component contained in the Distributed EDT module and an input expansion data component that receives data from the input expansion data component contained in the Distributed EDT module. A network data component receives data from the Distributed bus data component and communicates it to a network. The network data component includes an input data component that receives standard data from the input data component contained in the Distributed bus data component. An input expansion data component receives expansion data from the input expansion data component contained in the Distributed bus data component. A cyclic EDT communication status component schedules data received by the input expansion data component.

In still yet another aspect, a method is employed to facilitate communication between an adapter and a cyclic EDT module. The adapter is placed in an EDT idle mode and the cyclic EDT module is placed in idle mode. The lower half of an attribute index number is sent to the cyclic EDT module and the lower half of the attribute index number is echoed. The lower half of the index number is verified by the adapter and the upper half of the index number is sent to the cyclic EDT module. The upper half of the attribute index number is read by the cyclic EDT module. The idle state is set by the cyclic EDT module. A determination is made if the upper half of the edge of the index number should be employed or if the EDT is set to idle.

DETAILED DESCRIPTION

Real Time Data Extension for Distributed I/O can include defining specific attributes, module I/O functionality, and adapter functionality. Real Time Data Extension is an expansion onto the Distributed Bus Communication which allows larger input and output data sizes to and/or from Distributed I/O modules (e.g., I/O modules 126, 128). In the past, Distributed EDT communication protocol was designed to accommodate larger, configuration data to one or more Distributed I/O modules (e.g. I/O modules 126, 128) and to allow opportunity for other types of data. The Real Time Data Extension for Distributed I/O described herein leverages this Distributed EDT protocol and its design.

Data in the Distributed EDT modules are contained in assemblies. For example, there are input data assemblies, output data assemblies, module ID assemblies, etc. Each Distributed I/O module sets the data and the associated sizes accordingly. With Distributed I/O, the size of the input and output data assemblies are limited to a maximum of sixteen words. In order to expand the capability of Distributed I/O, these data sizes need to be enlarged. Since they cannot be directly increased on the Distributed I/O bus, the Real Time Data Expansion for Distributed I/O is facilitated by creating a secondary set of input/output data in the Distributed EDT modules (e.g., I/O modules 126, 128).

Figure 2:
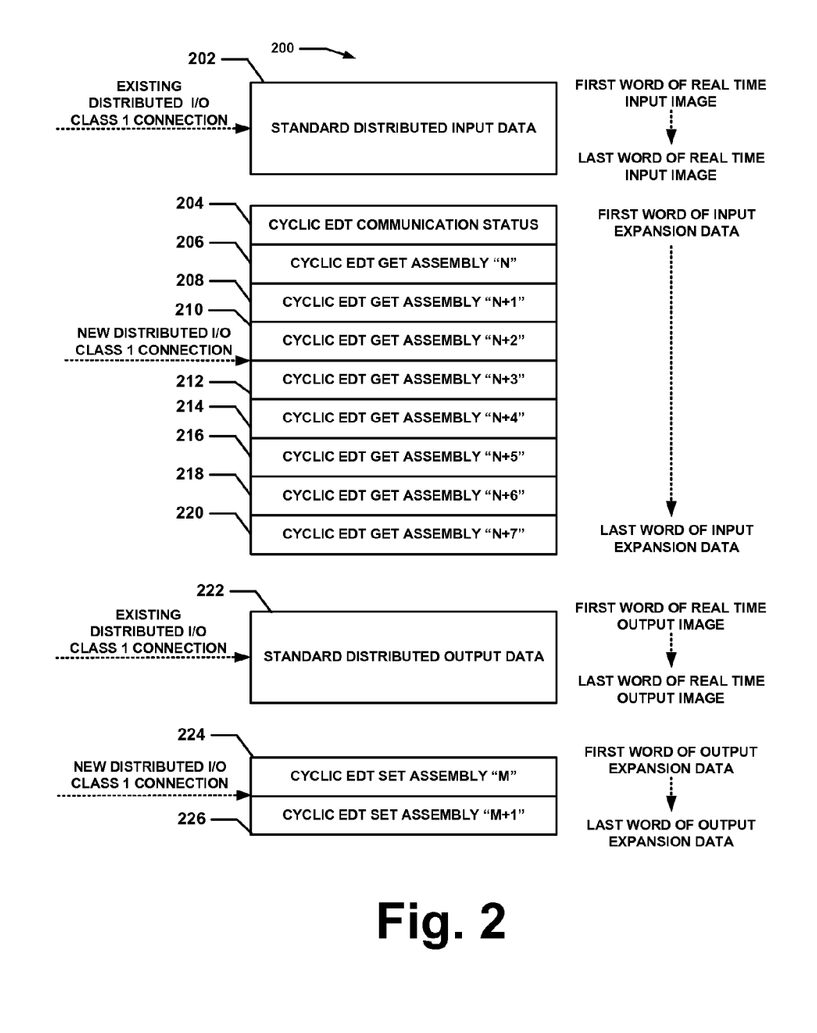
FIG. 2 illustrates standard and EDT input data and standard and EDT output data assemblies, in accordance with an exemplary embodiment.

FIG. 2 illustrates input and output data communicated within the control system 100. This data is communicated as standard input/output data and cyclic EDT input/output data. The adapter module 130 is updated to understand this second set of input and output expansion data while maintaining the existing set of input data 202 and output data 222. The input expansion data is a combination of module specific EDT assemblies 204, 206, 208, 210, 212, 214, 216, 218, and 220 that contain an access definition of "cyclic EDT get data." The output expansion data is a combination of module specific EDT assemblies 224, 226 that contain an access definition of "cyclic EDT set data."

In one example, the size of these new cyclic EDT assemblies, 204-220 and 224-226 is defined by a particular assembly member, such as 0x7D, for example. In one approach, assembly 0x7D is a Distributed EDT assembly which lists the available module specific assemblies and their associated sizes. This list can be enlarged to include the optional assemblies associated with input expansion data and output expansion data.

Figure 3:
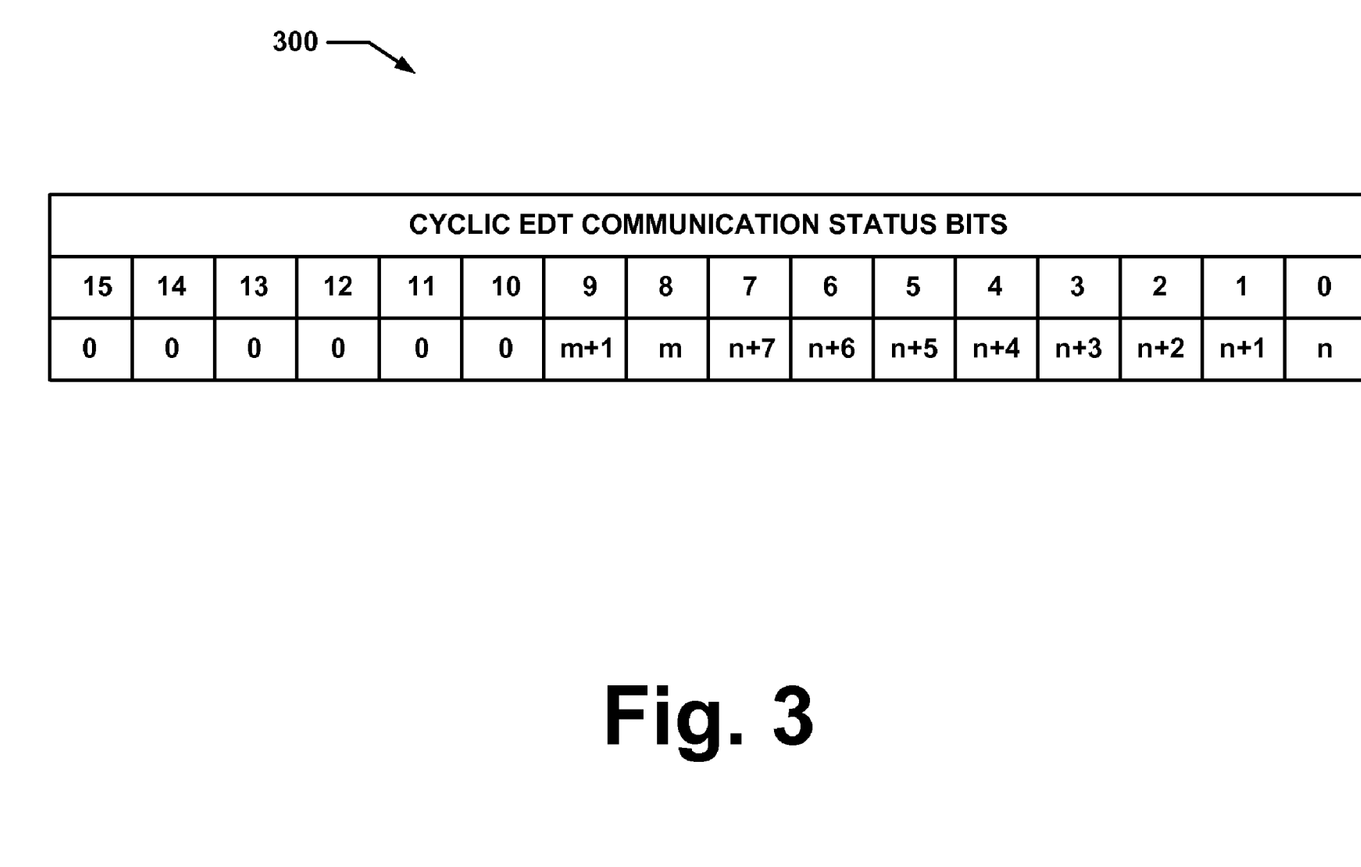
FIG. 3 illustrates a cyclic EDT communication word that includes sixteen status bits, in accordance with an exemplary embodiment.

FIG. 3 illustrates a cyclic EDT communication word 300 that includes sixteen bits. Each of these bits can be updated by the adapter 130 to provide a status for one or more cyclic EDT assemblies. In one example, the adapter 130 can monitor eight cyclic EDT get assemblies. Therefore, the status bit associated with the lowest cyclic EDT get assembly index will be placed into bit "0" of the cyclic EDT communication status words 300. A status bit associated with the second highest number cyclic EDT get assembly index will be placed into bit "1" and so on. In one embodiment, bits 0-7 correlate to the respective status of cyclic EDT get assemblies 206-220. In particular, bit 0 is the status bit for cyclic EDT get assembly "N"; bit 1 is the status bit for cyclic EDT get assembly "N+1"; bit 2 is the status bit for cyclic EDT get assembly "N+2"; bit 3 is the status bit for cyclic EDT get assembly "N+3"; bit 4 is the status bit for cyclic EDT get assembly "N+4"; bit 5 is the status bit for cyclic EDT get assembly "N+5"; bit 6 is the status bit for cyclic EDT get assembly "N+6"; and bit 7 is the status bit for cyclic EDT get assembly "N+7."

Once the adapter 130 has completed the bits associated with the cyclic EDT get assemblies, it moves onto the bits associated with the cyclic EDT set assemblies. In this example, the next available is bit 8. Therefore, bit 8 is the status bit associated with the first cyclic EDT set assembly and so on. In particular, bits 8 and 9 of the cyclic EDT communication word 300 correlate to the respective status of cyclic EDT set assemblies 224 and 226. In one example, bit 8 is the status bit for cyclic EDT set assembly "M" and bit 9 is the status bit for cyclic EDT set assembly "M+1."

In this example, the cyclic EDT communication word 300 includes status bits for eight cyclic EDT get assemblies and two cyclic EDT set assemblies. Therefore, the adapter 130 will clear the upper six unused bits in the cyclic EDT communication status word. However, it is to be appreciated that substantially any number of word and/or bit combinations can be employed to monitor the status of one or more cyclic EDT assemblies.

Figure 4:
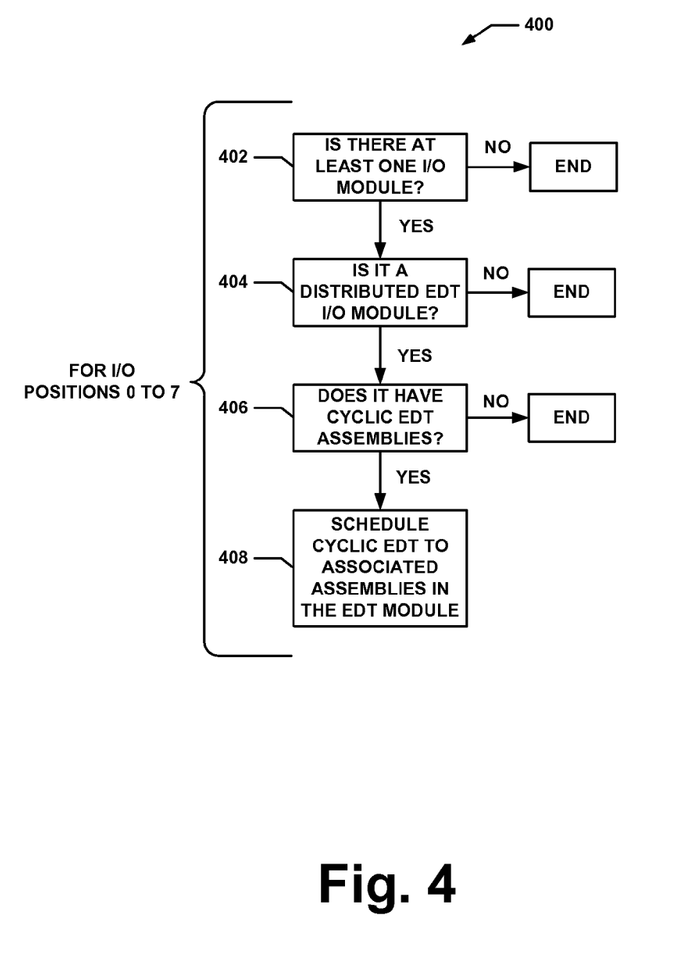
FIG. 4 illustrates a process that can be employed to utilize a real time data expansion protocol with a Distributed I/O module, in accordance with an exemplary embodiment.
Figure 8:
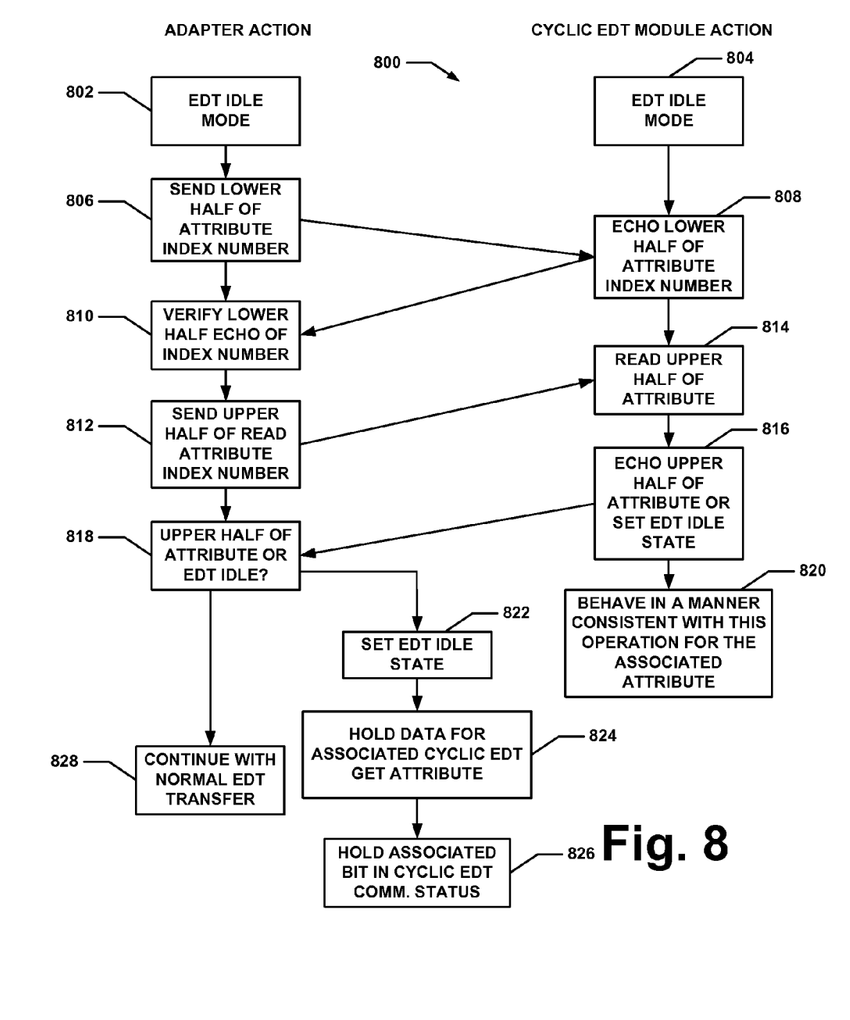
FIG. 8 illustrates a process of communication between an adapter and a cyclic EDT module, in accordance with an exemplary embodiment.

FIGS. 4 and 8 illustrate methodologies in accordance with the subject invention. For simplicity of explanation, the methodologies are depicted and described as a series of acts. It is to be understood and appreciated that the subject invention is not limited by the acts illustrated and/or by the order of acts, for example acts can occur in various orders and/or concurrently, and with other acts not presented and described herein. Furthermore, not all illustrated acts may be required to implement the methodologies in accordance with the subject invention. In addition, those skilled in the art will understand and appreciate that the methodologies could be represented as a series of interrelated states via a state diagram or events.

FIG. 4 illustrates the process 400 that can be employed to utilize the Real Time Data Extension protocol with a Distributed I/O module. At 402, the system is scanning to determine if it includes at least one I/O module. If not, the process 400 ends. If at least one I/O module is located, at 404, a determination is made as to whether the one or more modules are Distributed EDT I/O modules. If none of the modules are Distributed EDT I/O modules, the process 400 ends. If a Distributed EDT I/O module is found, then the adapter 130 can read a particular assembly index (e.g., 0x7D).

At 406, a query is performed to determine if the one or more Distributed EDT I/O modules have cyclic EDT assemblies. If none of the Distributed EDT I/O modules have cyclic EDT assemblies, then the process 400 ends. If cyclic EDT assemblies are identified, at 408, the cyclic EDT is scheduled to one or more associated assemblies in the EDT module. In one embodiment, the adapter 130 will initiate a cyclic EDT queue to the associated assemblies in the EDT module. In an embodiment, the adapter can sequentially work through the list of cyclic EDT assembly indexes and automatically re-queue them. In one example, if a MSG instruction is executed by a Logix processor, which requires an EDT transfer to the cyclic EDT module, then the adapter 130 will place the MSG's EDT request to run next in its queue. Upon completion of the MSG's EDT transfer, the adapter 130 will return to its cyclic EDT transfers.

Figure 5:
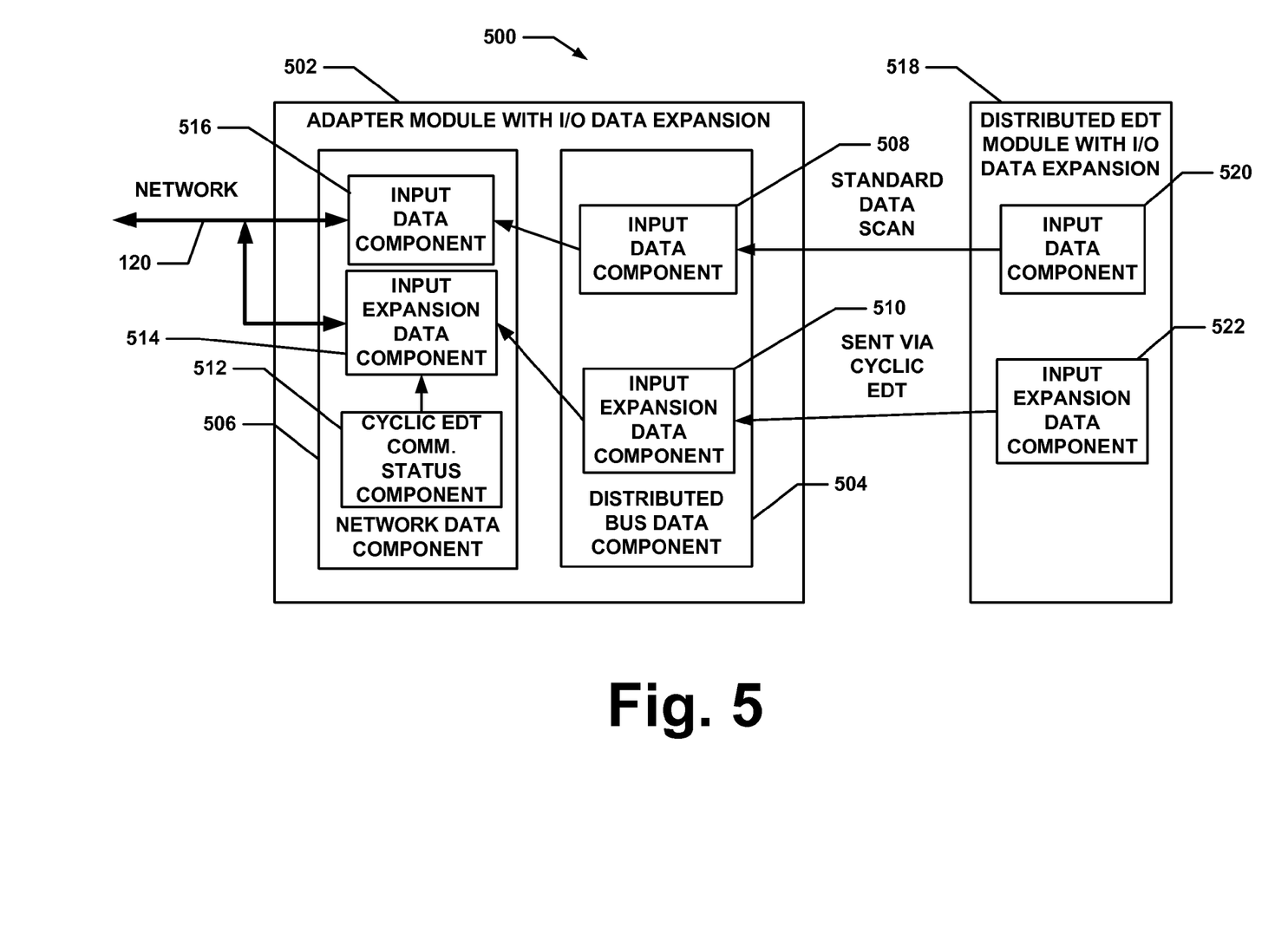
FIG. 5 illustrates the input data and input expansion data block system, in accordance with an exemplary embodiment.

FIG. 5 illustrates an input data and input expansion data block system 500. In this example, an adapter module 502 includes I/O data expansion. The adapter 502 is employed to interface between one or more terminals on the Distributed bus I/O network and data communicated on a network. The adapter module 502 includes a Distributed bus data component 504 and a network data component 506. The Distributed bus data component 504 includes an input data component 508 and an input expansion data component 510. The input expansion data component 510 may contain multiple cyclic EDT get data assemblies' indexes. The network data component 506 includes an input expansion data component 512, a cyclic EDT communication status component 514, and an input data component 516.

The adapter module 502 communicates with a Distributed EDT module 518 with I/O data expansion. The Distributed EDT module 518 includes an input data component 520 and an input expansion data component 522. The Distributed EDT module 518 receives data via the input data component 520 and/or the input expansion data component 522 from one or more sources (e.g., sensors, switches, intelligent control devices, etc.) in one or more formats (e.g., an analog, digital, serial, etc.). This input data is transmitted from the Distributed EDT module 518 to the network via the adapter module 502. In this manner, the system 500 receives both input data and input expansion data which is communicated through a network via two disparate data paths.

In particular, standard data is transmitted from the one or more sources to the network 120 via the input data component 520, the input data component 508, and the input data component 516. This input data is transmitted from the input data component 520 to the input data component 508 via standard data scan. The data is then communicated to the network 120 via the input data component 516.

Input expansion data is communicated throughout the system 500 via the input expansion data components 510, 514 and 522. The Distributed EDT module 518 receives input expansion data via the input data component 522 which communicates this information to the adapter module 502 via the input expansion data component 510. The adapter module 502 buffers this input expansion data from one or more assemblies with the access of cyclic EDT get data. This data is sent back to the processor via a class 1 (or equivalent) connection which is separate from the normal Distributed I/O scan. In one approach, a profile/applet for an associated Distributed I/O module with data extension is employed to place the expansion input and output data into the correct area/tags.

The cyclic EDT communication status component 512 schedules data received by the input expansion data component 514. The adapter module is updated to understand the set of input expansion data while maintaining the existing set of input data. The input expansion data is a combination of module specific EDT assemblies that contain the new access definition of cyclic EDT get data as described in FIG. 2 above. In one aspect, the size of the cyclic EDT assemblies is defined by a particular assembly number. In one approach, this assembly number is a Distributed EDT assembly which lists the available module specific assemblies and their associated sizes.

Figure 6:
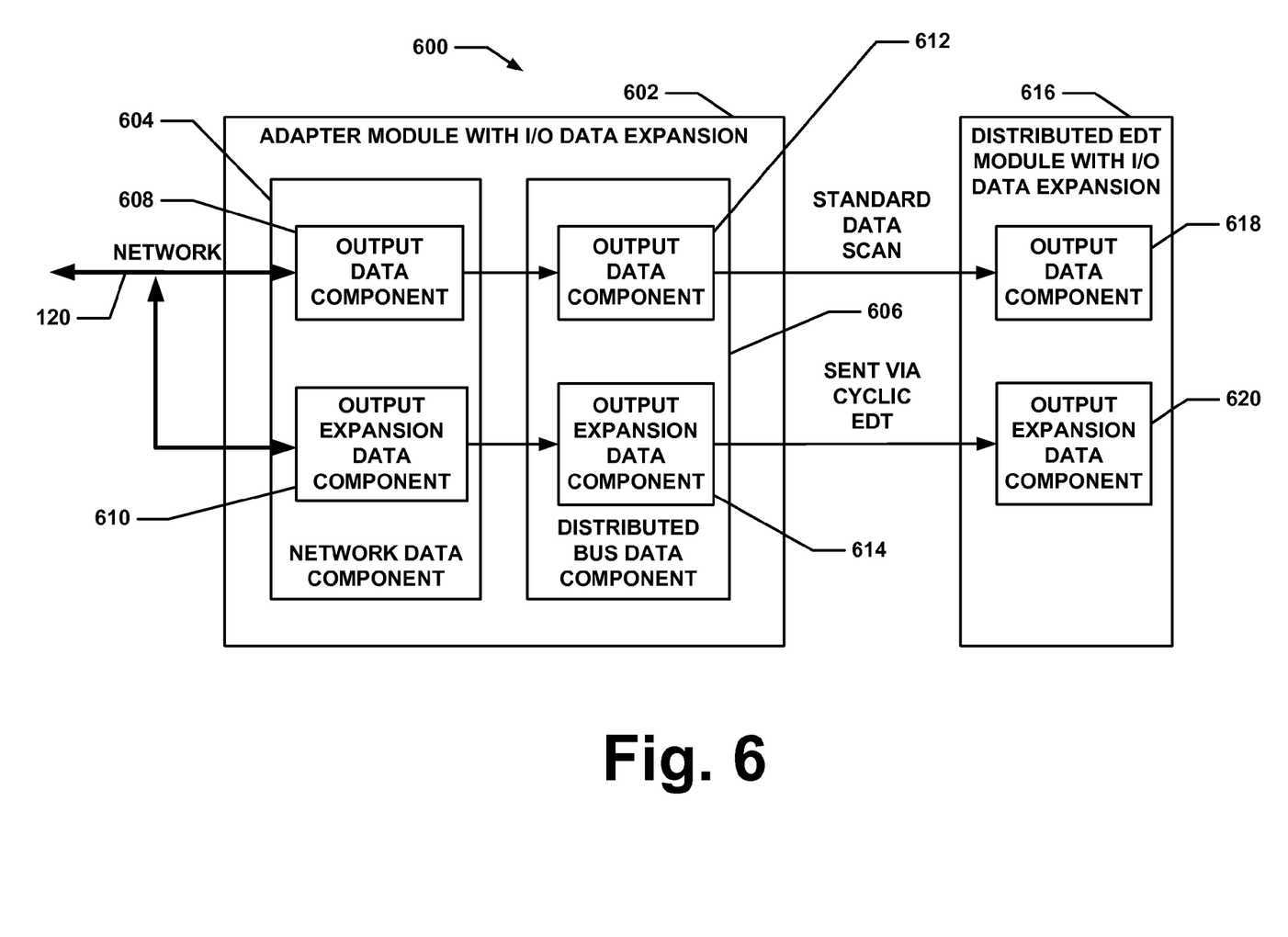
FIG. 6 illustrates an output data and output expansion data block system, in accordance with an exemplary embodiment.

FIG. 6 illustrates an output data and an output expansion data block system 600. In this example, an adapter module 602 includes I/O data expansion. The adapter module 602 includes a network data component 604 and a Distributed bus data component 606. The network data component is employed to allow the adapter module 602 to interface to the network 120. The Distributed bus data component 606 receives data from the network data component and transmits that data out to one or more Distributed EDT modules. The network data component 604 includes an output data component 608 and an output expansion data component 610. The output data component 608 is employed to receive standard output data from the network 120 and transmit it to the Distributed bus data component 606. The output expansion data component 610 receives expansion data from the network 120 and transmits such data to the Distributed bus data component 606.

The Distributed bus data component 606 includes an output data component 612 and an output expansion data component 614. Data received by the Distributed bus data component 606 is communicated to a Distributed EDT module 616 with I/O data expansion. The Distributed EDT module 616 includes an output data component 618 and an output expansion data component 620. Data from the network 120 is transmitted to the Distributed EDT module 616 in two paths: a standard output data path and an expansion output data path. The standard output data is transmitted from the network 120 to the Distributed EDT module 616 via output data components 608, 612, and 618. The output expansion data is transmitted from the network 120 to the Distributed EDT module 616 via the output expansion data component 610, 614, and 620. Standard output data is transmitted from the adapter module 602 to the Distributed EDT module 616 via a standard Distributed bus scan. Output expansion data is transmitted from the adapter module 602 to the Distributed EDT 616 via a cyclic EDT. In this manner output expansion data is sent to the Distributed EDT module 616 from the adapter module 602 via a class 1 (or equivalent) connection.

As illustrated, the adapter 602 can determine the size of output expansion data. In addition, the adapter 602 can determine the size of the cyclic EDT set data assemblies. With this information, the adapter 602 can separate the output expansion data and the associated cyclic set buffers and can transfer them to the I/O Distributed EDT module 616. As noted above, it is assumed that a profile/applet for the associated Distributed I/O module with data extension will be employed to place the expansion input and output data into the correct area/tags.

While cyclic EDT occurs without errors between the adapter 602 and the cyclic EDT assemblies, the adapter 602 will set (to a binary 1) the associated bit in the cyclic EDT communication status word 300 (as illustrated in FIG. 3 above). If a communication error occurs during the cyclic data transfer then the adapter will clear (to a binary 0) the associated bit in the cyclic EDT communication status word 300.

Figure 7A:
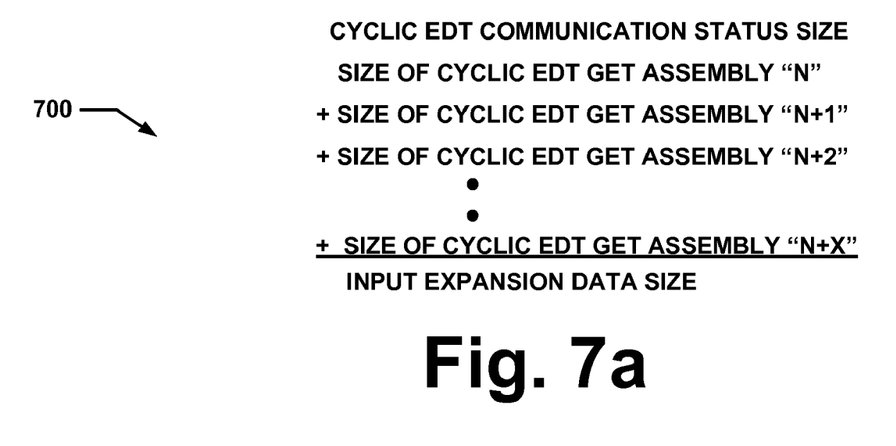
FIG. 7A illustrates an equation employed to determine the size of input expansion data, in accordance with an exemplary embodiment.

To determine the full size of the input expansion data for an associated cyclic EDT I/O module, the adapter 130 can use the formula 700 illustrated in FIG. 7A. The input expansion data size is determined via summation of the size of one or more EDT get assemblies. In this example, the cyclic EDT communication status size is determined by summing the size of at least one cyclic EDT get assembly. As shown, this can include the size of a get assembly "N", a get assembly "N+1", a get assembly "N+2" and one or more get assemblies "N+X" where X is an integer greater than or equal to 1.

Figure 7B:
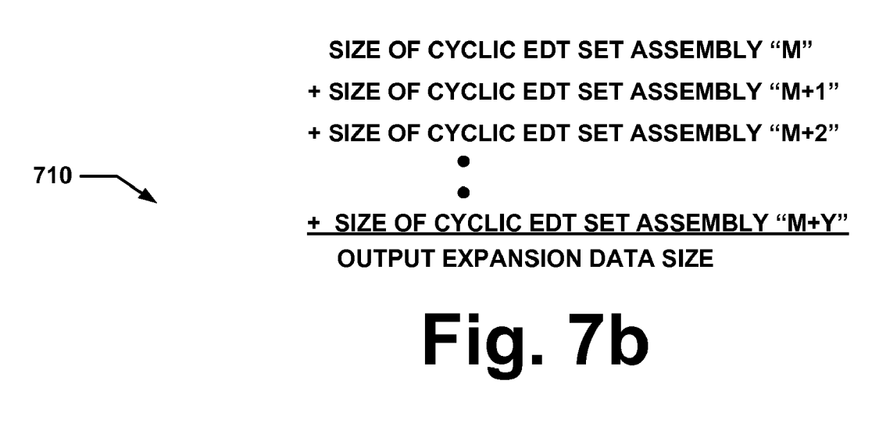
FIG. 7B illustrates an equation to determine the size of output expansion data, in accordance with an exemplary embodiment.

Similarly, to determine the full size of the output expansion data for an associated cyclic EDT I/O module, the adapter 130 can utilize the form of 710 illustrated in FIG. 7B. The output expansion data size is determined via summation of one or more EDT set assemblies. In this example, the output expansion data size is determined by summing the sizes of at least one cyclic EDT set assembly. As illustrated, this can include the size of a set assembly "M" a set assembly "M+1", a set assembly "M+2" and one or more set assemblies "M+Y" where Y is an integer greater than or equal to one.

As described above, a method for the cyclic EDT module to receive EDT traffic can be employed by going to its EDT idle state prior to transferring any data. When the adapter 130 finds this condition it can maintain a current level of the associated bit in the cyclic EDT communication status for it. From a user's standpoint, the bits in the cyclic EDT communication status can be considered "data valid bits". Such as: whenever a data valid bit is set (to a binary 1), then the associated data in a cyclic EDT assembly is OK to use in their latter logic parameter or any other programming language (program). Also, when the "data valid" is low (a binary 0), the user's program should take appropriate action.

FIG. 8 illustrates a communication between the adapter 130 and a cyclic EDT module. At 802, the adapter 130 is in EDT idle mode. Likewise, at 804 the cyclic EDT module is in idle mode. At 806, the lower half of an attribute index number is sent to the cyclic EDT module. At 808, the lower half of the attribute index number is echoed and, at 810, the lower half of the index number is verified by the adapter 130. Once the lower half of the echo of the index number is verified, the upper half of the index number is sent to the cyclic EDT module at 812. At 814, the upper half of the attribute index number is read by the cyclic EDT module. At 816, the cyclic EDT echoes the upper half of the attribute index number or an EDT idle to the adapter. At 818, the adapter determines if the upper half of the attribute index number or an EDT idle was received from the cyclic EDT module.

Once the Cyclic EDT module has sent either the upper half of the attribute index number or an EDT idle, it then behaves in a manner consistent with its decision for the associated attribute 820. If the adapter determines that the EDT should go into an idle state the EDT is set at 822 and data for the associated cyclic EDT get attribute is held at 824. At 826, a bit associated in cyclic EDT communication status is held at 826. Alternatively, if the upper half of the attribute index number is to be employed, at 828, then the normal EDT transfer is continued.

As noted, only Distributed EDT modules can have the capability to add real time data extension of Distributed I/O. A Distributed EDT module meeting this functionality will require the addition of new firmware assembly(s). The new assembly(s) will contain an associated new access definition. An exemplary list of access definitions is shown below with new definitions in italicized text:

| Enumeration | Access Definition |
|---|---|
| 0x00 | Set Data |
| 0x80 | Get Data |
| 0x40 | *Cyclic EDT Set Data* |
| 0xC0 | *Cyclic EDT Get Data* |

It is assumed that the contents of the assemblies associated with cyclic EDT are designed to minimize its size. This reduces the amount of effort and memory allocation in the adapter 130. It is also assumed that the Distributed EDT module will update the associated cyclic EDT assemblies during its normal internal module scan. In one example, the size of the new assemblies is defined in assembly number 0x7D. Assembly 0x7D is an existing Distributed EDT assembly which lists the available module specific assemblies in their associated sizes. This list in the Distributed EDT module can be enlarged to include the assemblies associated with cyclic EDT data (input expansion data and output expansion date information) in its list.

In one approach, the adapter module 130 combines data from the cyclic EDT get data assemblies with their standard Distributed input data for the associated I/O module and send it to a processor during a normal input update. For outputs, the adapter separates the standard Distributed output data from the cyclic EDT set data and forwards the data according to its associated transport (e.g., EDT or standard I/O update).

To reduce EDT traffic which improves data through port, the EDT I/O module can elect to send no data for a specific cyclic EDT assembly. In other words, the cyclic module acknowledges a specific EDT assembly and then goes to its EDT I/O state. When the adapter identifies this condition for its cyclic EDT get assembly, the adapter will hold all input expansion data associated with the assembly. When the cyclic EDT I/O module identifies this condition for a cyclic EDT set, the I/O module behaves in a manner consistent with this operation. If the EDT module goes to its idle state after its first byte is sent or at any other time in the data transfer, then the adapter 130 will declare an error.

In one embodiment a user installs a cyclic EDT module and the Logix's communication tree utilizing the following.

Once installed, the user can select the cyclic EDT module to configure the module and its associated RPI. In one example to obtain the expansion I/O data, the user can add a connection below the cyclic EDT module as shown below.

At this point the user can select the cyclic expansion data to view/modify the associated data and its RPI. It is assumed that a profile/applet for the associated Distributed I/O module with data extension will be need to place the expansion input and output data into the correct area/tags.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A system that communicates data from a network to an input/output module, comprising:
   an adapter module that receives data, the adapter module includes:
      a network data component that receives data from the network including,
         an output data component that receives standard data; and
         an output expansion data component that receives cyclic extended data transfer data, including a lower half and an upper half of an attribute index number, and
      a Distributed bus data component that receives data from the network data component, the Distributed bus data component includes,
         an output data component that receives standard data from the output component contained in the network data component; and
         an output expansion data component that receives cyclic extended data transfer data from the output expansion data component contained in the network data component, wherein the lower half of the attribute index number is received, echoed to the extended data transfer module and verified and the upper half of the attribute index number is received, echoed to the extended data transfer module and verified,
   a Distributed extended data transfer module that receives data from the adapter module via the Distributed bus data component, wherein standard output data is communicated utilizing a standard data scan, and expansion output data is communicated utilizing a cyclic extended data transfer protocol.

2. The system according to claim 1, wherein data in the Distributed extended data transfer module is contained in one or more cyclic extended data transfer assemblies.

3. The system according to claim 2, wherein the one or more assemblies contain an access definition of cyclic extended data transfer data.

4. The system according to claim 3, wherein the size of each of the one or more cyclic extended data transfer assemblies is defined by an assembly number.

5. The system according to claim 2, wherein the data is assigned to one or more available assemblies.

6. The system according to claim 2, wherein each assembly is monitored by one or more status bits in a cyclic extended data transfer communication word.

7. The system according to claim 6, wherein the lowest set assembly is assigned to the lowest available status bit in the cyclic extended data transfer communication word.

8. The system according to claim 1, wherein the adapter module can determine the size of at least one of output expansion data and cyclic extended data transfer set data assemblies.

9. The system according to claim 8, wherein the adapter module separates output expansion data and one or more associated cyclic set buffers and transfers them to the Distributed extended data transfer module.

10. The system according to claim 6, wherein the adapter module will set an associated bit in the cyclic extended data transfer communication status word when there are no communication errors between the adapter module and the cyclic extended data transfer assemblies.

11. The system according to claim 6, wherein the adapter module will clear an associated bit in the cyclic extended data transfer communication status word when there are one or more communication errors between the adapter module and the cyclic extended data transfer assemblies.

12. A method to utilize a real time data extension protocol with a Distributed I/O module:
scanning one or more modules to determine if it includes at least one I/O module;
determining if at least one of the I/O modules is a Distributed I/O module;
identifying at least one cyclic extended data transfer assembly in the at least one Distributed I/O module; and
communicating data between the distributed I/O module and an adapter, the data includes a lower half and an upper half of an attribute index number, wherein the lower half of the attribute index number is received, echoed to the distributed I/O module and verified and the upper half of the attribute index number is received, echoed to the distributed I/O module and verified.

13. The method according to claim 12, wherein a cyclic extended data transfer queue is initiated to the one or more assemblies in the extended data transfer module, the list of cyclic extended data transfer assemblies can be scanned and automatically re-queued.

14. The method according to claim 13, wherein when an extended data-transfer to a cyclic extended data transfer module is required by an instruction, the instruction can be placed in a queue and executed in a future cycle.

15. The method according to claim 14, wherein upon completion of the instruction, the execution of one or more cyclic extended data transfers is resumed.

16. A system that communicates data from an input/output module to a network, comprising:
a Distributed extended data transfer module that receives data from one or more sources, the Distributed extended data transfer module includes,
an input data component that receives standard data; and
an input expansion data component that receives expansion data, including a lower half and an upper half of an attribute index number, and
an adapter module that receives data from the distributed extended data transfer module, wherein standard output data is communicated utilizing a standard data scan, and expansion output data is communicated utilizing a cyclic extended data transfer protocol, the adapter module includes:
a Distributed bus data component that receives data from the Distributed extended data transfer module, the Distributed bus data component includes,
an input data component that receives standard data from the input component contained in the Distributed extended data transfer module; and
an input expansion data component that receives data from the input expansion data component contained in the Distributed extended data transfer module, wherein the lower half of the attribute index number is received, echoed to the extended data transfer module and verified and the upper half of the attribute index number is received, echoed to the extended data transfer module and verified,
a network data component that receives data from the Distributed bus data component and communicates it to a network, the network data component includes,
an input data component that receives standard data from the input data component contained in the Distributed bus data component; and
an input expansion data component that receives expansion data from the input expansion data component contained in the Distributed bus data component; and
a cyclic extended data transfer communication status component that schedules data received by the input expansion data component.

17. The system according to claim 16, wherein data in the Distributed extended data transfer module is contained in one or more assemblies.

18. The system according to claim 17, wherein the data is assigned to one or more available assemblies by the cyclic extended data transfer communication status component.

19. A method for facilitating communication between an adapter and a cyclic extended data transfer module, comprising:
placing the adapter in an extended data transfer idle mode;
placing the cyclic extended data transfer module in idle mode;
sending the lower half of an attribute index number to the cyclic extended data transfer module;
echoing the lower half of the attribute index number;
verifying the lower half of the index number by the adapter;
sending the upper half of the index number to the cyclic extended data transfer module
reading the upper half of the attribute index number or extended data transfer idle from the cyclic extended data transfer module
determining if the upper half of the attribute index or extended data transfer idle was received from the cyclic extended data transfer module
setting the extended data transfer idle state or performing an extended data-transfer as appropriate.

20. The method according to claim 19, further including:
processing an associated attribute in a manner consistent with the operation utilized once the extended data transfer idle state has been set by the cyclic extended data transfer module, including, setting the extended data transfer if the adapter determines that the extended data transfer should go into an idle state;

holding data for an associated cyclic extended data transfer get attribute;

holding a bit associated in cyclic extended data transfer communication status; and transferring normal extended data transfer if the upper half of the attribute index number is to be employed.

* * * * *